(12) United States Patent
Look et al.

(10) Patent No.: US 8,547,481 B2
(45) Date of Patent: Oct. 1, 2013

(54) APPARATUS AND METHOD FOR BLACK BAR DETECTION IN DIGITAL TVS AND SET-TOP BOXES

(75) Inventors: Paul M. Look, Plano, TX (US); Masaki Kato, Kawasaki (JP); Weider Peter Chang, Colleyville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/973,241

(22) Filed: Dec. 20, 2010

(65) Prior Publication Data

US 2013/0100349 A1 Apr. 25, 2013

(51) Int. Cl.
*H04N 5/46* (2006.01)
*H04N 5/21* (2006.01)

(52) U.S. Cl.
USPC .......................................... 348/558; 348/625

(58) Field of Classification Search
USPC ................ 348/173, 558, 625; 382/254
See application file for complete search history.

(56) References Cited

U.S. PATENT DOCUMENTS

| | | | | |
|---|---|---|---|---|
| 5,760,840 A * | 6/1998 | Tani et al. | ...................... | 348/558 |
| 5,808,697 A * | 9/1998 | Fujimura et al. | .............. | 348/672 |
| 6,163,621 A * | 12/2000 | Paik et al. | ..................... | 382/169 |
| 6,208,385 B1 * | 3/2001 | Konishi et al. | ................ | 348/558 |
| 6,366,706 B1 * | 4/2002 | Weitbruch | ..................... | 382/254 |
| 6,947,097 B1 * | 9/2005 | Joanblanq | ..................... | 348/558 |
| 7,009,661 B2 * | 3/2006 | Sato | ............................. | 348/558 |
| 7,129,992 B2 * | 10/2006 | Barnichon | .................... | 348/556 |
| 7,339,627 B2 * | 3/2008 | Schoner et al. | ............... | 348/558 |
| 7,349,031 B2 * | 3/2008 | Hosomi | ........................ | 348/558 |
| 7,612,830 B2 * | 11/2009 | Seo et al. | ...................... | 348/556 |
| 8,098,328 B2 * | 1/2012 | Fujisawa et al. | ............. | 348/558 |
| 2004/0119891 A1 * | 6/2004 | Barnichon | .................... | 348/556 |

\* cited by examiner

*Primary Examiner* — Brian Yenke
(74) *Attorney, Agent, or Firm* — Robert D. Marshall, Jr.; Wade James Brady, III; Frederick J. Telecky, Jr.

(57) ABSTRACT

This invention is a preprocessor apparatus and method algorithm facilitating black bar detection in video frames or fields. The preprocessing marks a sharp discontinuity between pixels a predetermined distance apart on each line. On first detection of this discontinuity the location and pixel value is stored. The location and pixel value is also stored for the last discontinuity in the line. This data enables software to detect top horizontal bars, bottom horizontal bars, left vertical bars and right vertical bars.

17 Claims, 6 Drawing Sheets

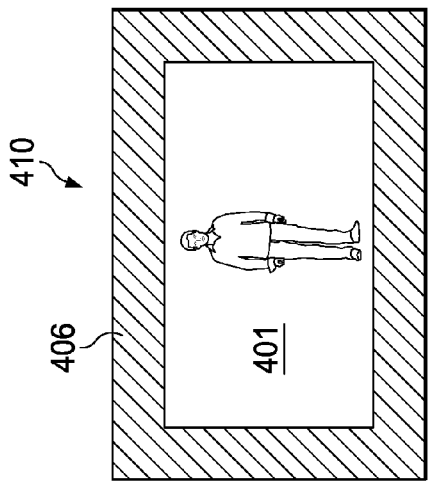
FIG. 4A
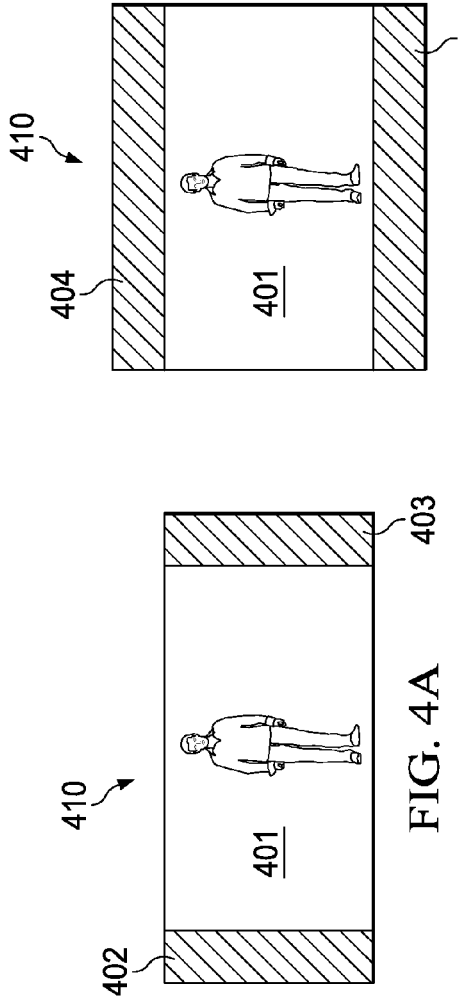
FIG. 4B
FIG. 4C
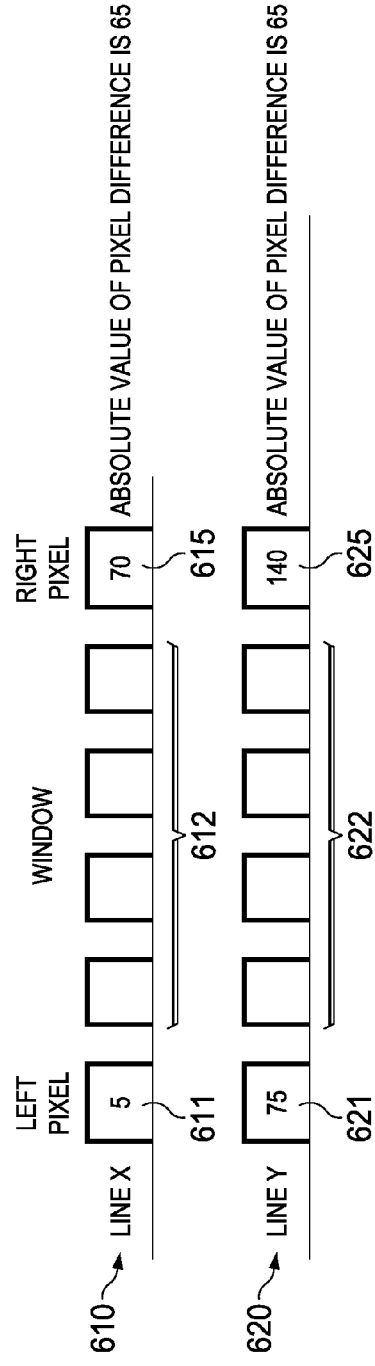
FIG. 6

APPARATUS AND METHOD FOR BLACK BAR DETECTION IN DIGITAL TVS AND SET-TOP BOXES

TECHNICAL FIELD OF THE INVENTION

The technical field of this invention is detection of black areas of television pictures.

BACKGROUND OF THE INVENTION

Most high-definition television receivers (HDTVs) display picture information in a 16:9 aspect ratio. Earlier video productions utilize Legacy Video Programming (LVP) in which the picture has a 4:3 aspect ratio. It is possible for broadcasters to fit legacy video inside a 16:9 window by transmitting the legacy video along with black bars on either edge of the screen. From a receiver standpoint, it is possible to stretch the legacy video horizontally to fill up the full width of the screen. However, the receiver must first find the edges of the black bars.

A black bar detection algorithm was implemented in earlier Texas Instruments video receivers decoding high-definition television (HDTV) signals. In these systems the reverse process works equally well. In the reverse process a 16:9 aspect ratio video raster is broadcast in a 4:3 aspect ratio picture with black bars at the top and bottom.

Digital Terrestrial TV has no adjacent channel interference problems, so they may be sited in adjacent frequency bands. The frequency range for US Digital TV (ATSC) is the same range as Analog TV. The 6 MHz spectrum allocated for digital TV stations were sited in the unused sites within the broadcast TV blocks in the Analog TV spectrum. It was a requirement for digital TV modulation to not interfere with Analog TV. The US Digital TV Standard is called Advanced Television Systems Committee (ATSC). Since the frequency range for US Analog TV and ATSC Digital TV is the same, the same tuner can be used for both.

FIG. 1 illustrates usage of the display processor in set-top box applications. The antenna 101 captures a portion of the broadcast RF spectrum. RF tuner 102 captures a particular channel from antenna source 101. Cable 103 receives input from a cable television source. RF tuner 104 captures a particular channel from cable 103. For satellite reception, a parabolic dish directs microwave frequency spectrum to a focal point where a Low Noise Block (LNB) 105 resides. The LNB outputs baseband intermediate frequency (IF), which is fed through coaxial cable to a set-top box.

The RF Tuner 102 isolates a single 6 MHz band and usually outputs Intermediate Frequency Baseband. Since the frequency ranges for US terrestrial Analog TV and ATSC digital TV are the same, the same tuner can support both. The cable frequencies are in a similar range to terrestrial broadcast frequencies. Usually the same tuner design can be used for cable as for terrestrial broadcast. Multiplexer 106 selects one of these three intermediate frequency (IF) signal as output 107.

The demodulator 108 extracts a digital bitstream from the IF modulated signal 107 and passes the demodulated information 109 to the video processor 110. The digital bitstream 109 carries Forward Error Correction data, which may be used to correct or at the very least detect errors in the transmission. The error corrected Transport Packets contain time multiplexed compressed video, compressed audio, and system information.

The majority of TV display devices 112 and 113 utilize a 16:9 LCD or Plasma panel. The input is digital red-green-blue (RGB), which is saved into a frame buffer memory inside the LCD panel displays 112 and 113.

The HDMI unit 111 provides the standard interface for connecting DVD players or set-top boxes to HDTVs. HDMI carries uncompressed digital video. Audio is inserted in the blanking periods of the uncompressed video and can be uncompressed pulse code modulation (PCM) or compressed in several different formats. The transmitted signal is a digital bitstream with error correction. ATSC uses a modulation scheme called Vestigial Sideband Modulation (VSB). US cable systems typically use Quadrature Amplitude Modulation (QAM). US satellite systems use Quadrature Phase Shift Keying (QPSK).

FIG. 2 illustrates a prior art video receiver system implemented as a system on chip (SoC) 200 that integrates the main functions of a digital television (DTV) receiver. SoC 200 receives four inputs signals. Digitized PCM audio input drives inter-IC sound (I2S) input 211. The output of I2S input 211 feeds memory interface (MI) 210. MI 210 controls data transport between inputs and outputs. Digitized video input drives video input buffer (NV) 212 which in turn drives MI 210. Analog video input drives NTSC/PAL/SECAM decode unit 213. NTSC/PAL/SECAM decode unit 213 converts the analog input in one of three analog video standards National Television Standards Committee (NTSC), Phase Alternating Line (PAL) or Sequential Couleur Avec Memoire (SECAM) into digitized video for input to NV 212. Transport packet parser (TPP) 214 receives an input transport bitstream. TPP 214 typically includes support for OpenCable™ point of deployment (POD) for interface to digital cable. This data is further processed by packetized elementary stream (PES) parser 215 with its output going to MI 210.

SoC 200 includes several intermediate processing units that transfer data to and from MI 210. Audio processor 221 supports multiple audio formats decoding and processing. MP@HL MPEG-2 Video Decoder 222 fully decodes all advanced television standards committee (ATSC) digital television (DTV) video formats. Central processing unit (CPU) 223 controls the memory mapped internal devices and runs the application software. On-chip peripherals 224 are integrated into current display processors to further reduce system cost. On-chip peripherals 224 may include one or more universal asynchronous receiver/transmitters, programmable infrared (IR) input and output ports, a SmartCard interface, an extension bus to connect peripherals such as display and control panels and additional I2C interfaces. On-chip peripherals 224 may be bidirectionally coupled to MI 210 (not shown).

SoC 200 includes a mixed memory interface. This included direct memory access (DMA) unit 225 connected to MI 210 and to external bus interface 226. External bus interface 226 handles access to random access memory (RAM) 241, read only memory (ROM) 242 and Flash memory 243. Double data rate memory interface (DDRI) 244 interfaces with MI 210 and exchanges data with synchronous dynamic random access memory (SDRAM) 245.

SoC 200 includes a number of outputs. Audio output controller (AOC) 231 receives data from MI 210. AOC 231 outputs PCM audio and supplies PCM audio to NTSC encoder 236. Display Processor 232 includes the ability to convert any ATSC DTV format to any other format, including non-standard display resolutions support for panel based DTVs. On-screen display (OSD) controller 233 also includes a 2D graphics accelerator and supports applications with laid on text such as a sophisticated Graphical User Interface (GUI). High definition (HD) encoder 234 receives video data from MI 210 via OSD controller 233 and generates a digital signal for a corresponding HD display. This digital signal may be directly output from SoC 200 via digital video output. This digital signal also supplies video digital to analog converters (DAC) 235. Video DACs 235 generate analog signals to drive displays requiring such signals. These analog signals are generally output as color component signals or as a composite video signal. The output selected corresponds to the particular attached display device. NTSC encoder 236 receives data from MI 210, from AOC 231 and from display processor 232. NTSC encoder 236 generates a NTSC standard signal supplied to video DACs 235 for output as color component signals or as a composite video signal.

SUMMARY OF THE INVENTION

This invention is a digital television receiver incorporating a black bar detection algorithm that facilitates the suitable presentation of picture information transmitted in various aspect ratios, when decoding high-definition television (HDTV) signals.

The invention provides a more reliable detection result while providing flexibility in using the CPU to vary the algorithm and adjust thresholds. In the system of the invention the reverse process works equally well. For example, a 16:9 aspect ratio video raster can be produced from a picture broadcast in a 4:3 aspect ratio by placing black bars at the top and bottom.

In hardware, the black bar detector analyzes an entire transmitted frame of video in real-time and provides the necessary information to perform configuration of the elements of a dataflow path. The software configuration task utilizes an edge detection algorithm which uses the results obtained to program the composite information to stretch the video to fill the screen.

BRIEF DESCRIPTION OF THE DRAWINGS

These and other aspects of this invention are illustrated in the drawings, in which:

FIG. 4 illustrates three types of black bar/black box patterns detectable using the technique of this invention (a) Curtains; (b) Letterbox; and (c) Box;

FIG. 6 illustrates waveforms of signals performing the pixel interface from memory manager to De-Interlacer.

DETAILED DESCRIPTION OF PREFERRED EMBODIMENTS

This invention presents a solution that gives a more reliable detection result while providing flexibility in using the CPU to vary the algorithm and adjust thresholds. In hardware the black bar detector analyzes an entire frame of video real-time and provides information to a software task.

The software task runs an edge detection algorithm and programs hardware elements of the display processor pipeline to generate composite information that stretches the video to fill the screen. Alternately the video analysis can be done completely in software by analyzing only select portions of a picture. However this approach yields inconsistent results that are very dependent on the input scene.

Figure 3:
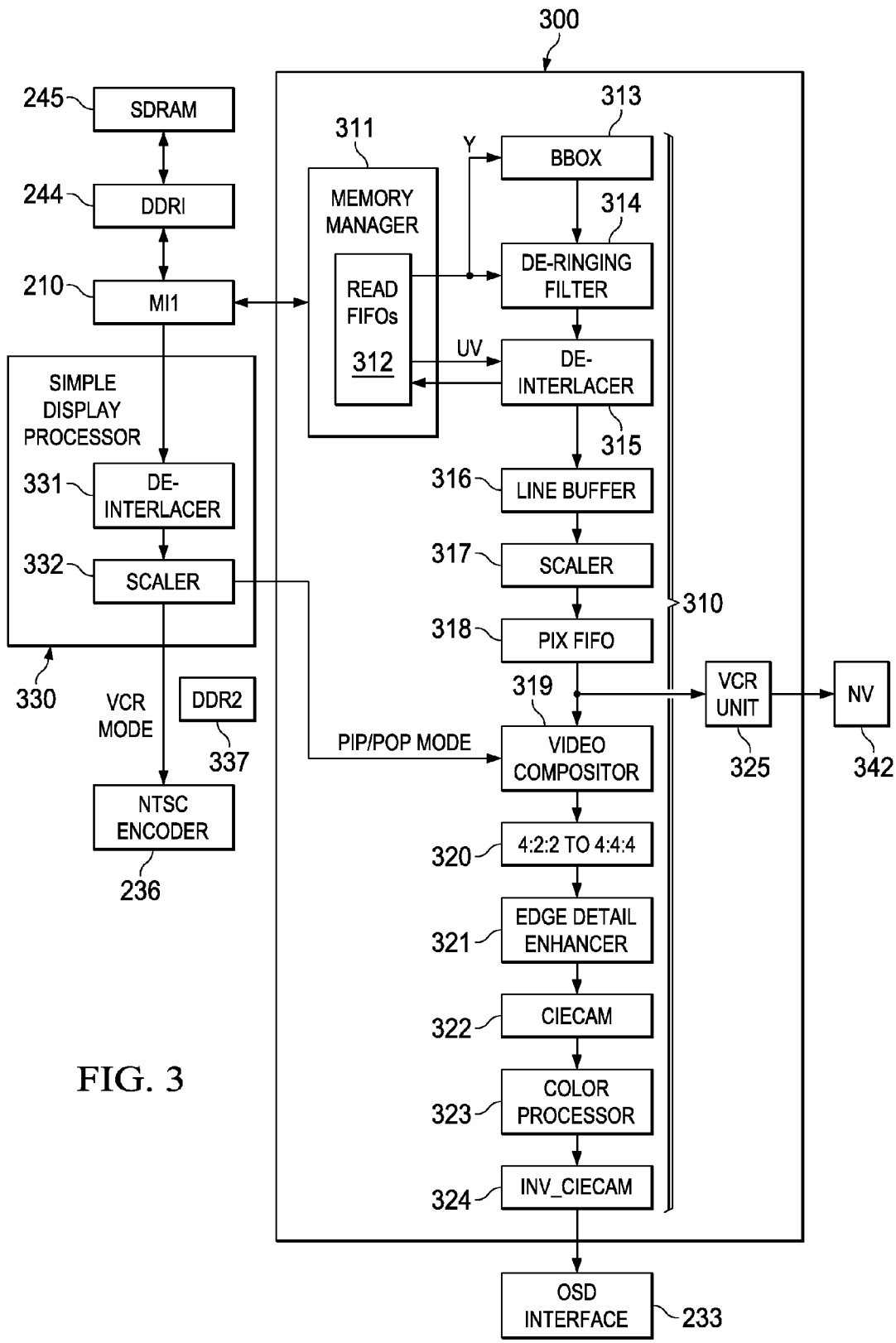
FIG. 3 illustrates the block diagram of a digital video receiver having the elements required for implementing a display processor performing black box detection utilizing the hardware and software features of this invention.

FIG. 3 illustrates display processor 300 of this invention showing dataflow path 310 for the operations performed. Current video receiver systems require external memory for the video and audio decoder and the application software. Double data rate memory interfaces DDRI 244 and DDRI 337 control storage of picture information.

Memory manager 311 obtains a picture from SDRAM 245 via MI1 memory module 210 and DDRI 244 and sends luma content to read FIFOs 312. Chroma pixels are upsampled to 4:2:2 before being sent to a FIFOs 312. Past field information as well as per-field data stores are also buffered in Read FIFOs 312. All this data in the read FIFOs 312 are sent to the de-interlacer 315.

Luma and chroma values are read from frame buffers in DDRI 244 and are submitted to the display processor pipeline 310. Private data stores the de-interlacer 315 are saved via DDRI 244 for use by future frames. These private data stores contain past information that is used to deinterlace the fields of video into a frame of video.

The unified double data rate 32-bit memory interface DDRI 244 and a second independent 16-bit memory interface DDRI 337 provide adequate bandwidth to support high performance HDTV applications.

Block box detector 313 is an edge detection unit that provides information for the system CPU 211. This enables CPU 211 to program display processor 300 to crop black or grayscale bars at the top/bottom or left/right of the picture. This information can also be used to crop a black or grayscale box surrounding the video. These patterns of black bars are referred to as curtains, letterbox and box are illustrated in FIG. 4.

Referring again to FIG. 3, de-ringing filter 314 removes compression artifacts. When edges in video are compressed, the decompressed image often contains ringing or banding artifacts at one or both sides of the edges. De-ringing filter 314 smoothes out the ringing artifacts so they are not as noticeable.

De-interlacer 315 converts interlaced fields into progressive frames. Many input sources, 480I or 1080I for example, are interlaced. Newer LCD, Plasma, or DLP TVs display a progressive image. When given an interlaced input, de-interlacer 315 creates a progressive output. Thus a 1080I input becomes a 1080P output. When supplied a progressive input, de-interlacer 315 automatically outputs a progressive frame. De-interlacer 315 outputs pixels from two lines at a time.

De-interlacer 315 also incorporates an optionally enabled temporal noise filter. For a stationary scene, there can be many sources of random noise that appear in certain areas frame by frame. The sources of noise can be the image sensors, old tape or film material, or noise in analog electronics while the picture is being digitized. By looking at several frames, random noise that occurs for only a few frames can be removed. For a static scene, temporal noise reduction works well. For a scene with motion, the filter must take care to not create filter artifacts.

Line buffer 316 takes in two lines at a time from the de-interlacer 315 and sends pixels one line at a time to the scaler 317.

Scaler 317 takes in video of any input width and height size and outputs video at a selected output width and height size. Scaler 317 can scale using the same ratio in both the horizontal and vertical directions. Alternatively scaler 317 may use different ratios in the horizontal and vertical directions. The output video can be made to appear stretched in one direction. In normal operation scaler 317 often outputs a large group of pixels and then stops for many clock cycles before outputting more pixels. PIX FIFO 318 buffers a number of pixels in a FIFO to smooth out the burst-like nature of the pixel data coming from scaler 317.

Video compositor 319 takes one source to create a main video window. It can optionally take video from a second source for a smaller picture-in-picture (PIP) window. Both windows are composited over a background color plane. If the main window and PIP window are scaled smaller and placed side by side, the result is a picture-out-of-picture (POP) display. Video compositor 319 also has the capability to crop each of the two input sources. Edge detection 321 adjusts the sharpness of the video by detecting and enhancing edges.

In the display processor datapath 310 all modules prior to CIECAM 322 operate on 4:2:2 YUV data including a luminance component Y and two chromanance components U and V. CIECAM 322 converts this YUV data into red, green and blue (RGB) data. The RGB data is converted into the CIECAM02 color space. This CIECAM variant is called CIECAM02 because CIE (Commission Internationale de l'eclairage) ratified the specification in 2002. CIECAM02 encoded data is believed to maintain flesh tones easily while allowing color changes to other areas of the picture.

Figure 1:
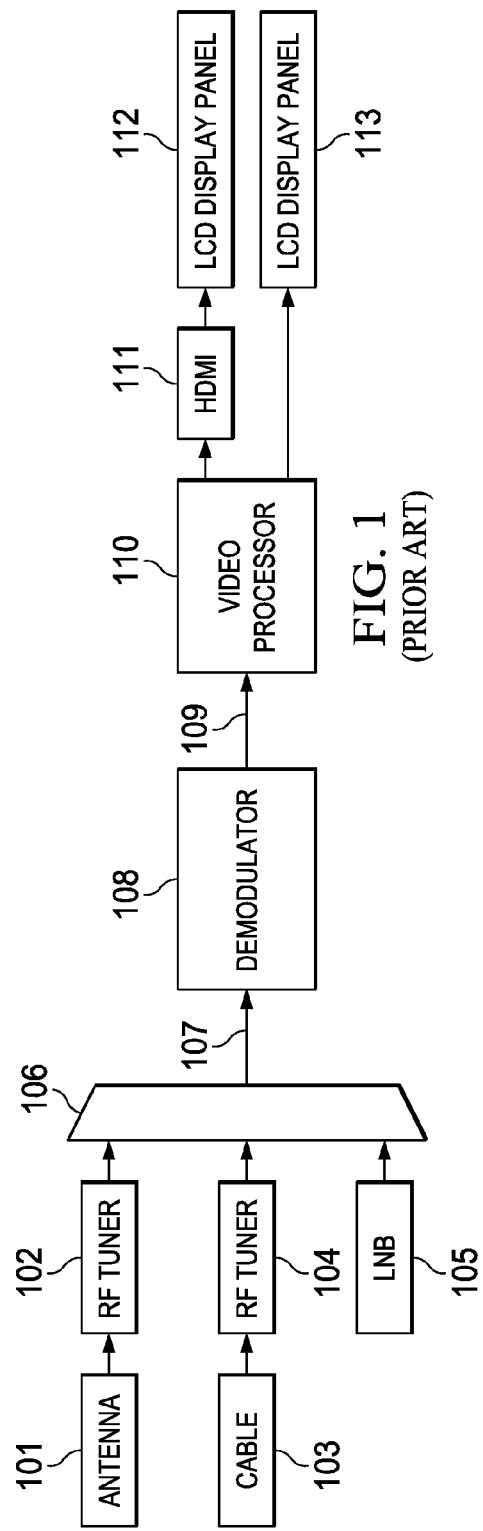
FIG. 1 illustrates usage of the display processor in set-top box applications (Prior Art)
Figure 2:
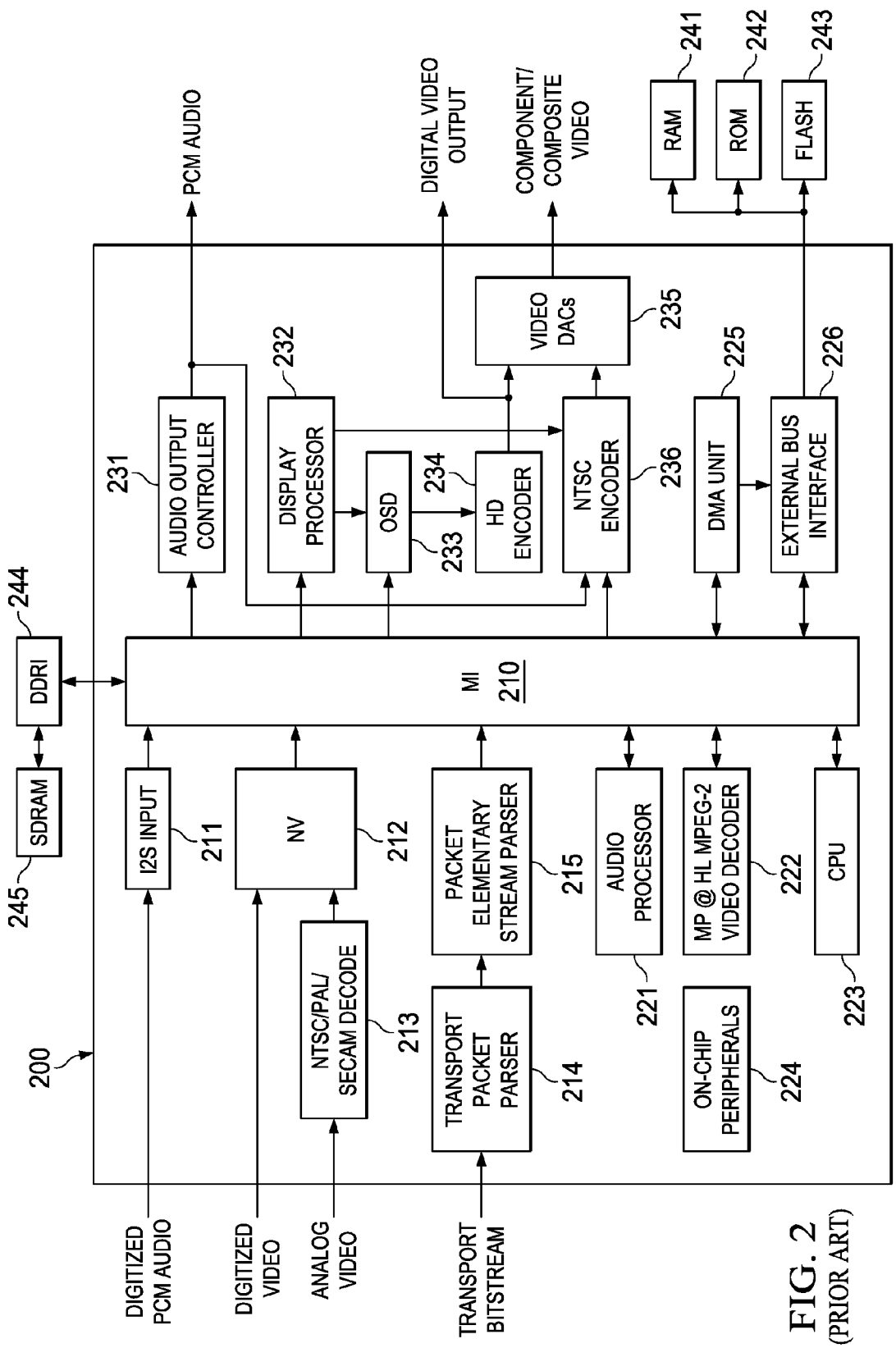
FIG. 2 illustrates an example block diagram for a current digital video receiver (Prior Art)

Color processor 323 performs hue, saturation and color changes to the video. INV CIECAM 324 extracts the color corrected picture from color processor 323 and converts it to the RGB color space. This RGB picture is passed to the on-screen-display interface unit 233 is previously illustrates in FIG. 2.

On-screen display interface unit 233 has capability to blend one or more planes of graphics with video. Typically, a program guide can be shown on top of running video or the program guide may be blended with active video. On-screen display interface can drive an HDTV output via HD encoder 234 and optionally video DACs 235 illustrated in FIG. 2.

VCR unit 325 taps off the interface between the PIX FIFO 318 and video compositor 319. VCR unit 325 sends digitally coded Luma and Chroma 4:2:2 pixel values from PIX FIFO 318 to NV unit 342. NV unit 342, when employed with this chip-internal source, will frame buffer the video into the DDRI 337. This data flow allows display processor 300 to simultaneously output a high definition picture to the primary display and to output the same video to NTSC encoder 236. The user can connect a standard definition VCR or DVD recorder to NTSC output 236 to record in standard definition using a DVD recorder or VCR the same show viewed on the high quality display.

Display processor 300 supports either VCR mode or PIP/POP mode. Video compositor 321 outputs the desired screen sized picture. In PIP/POP mode a second frame can be read from DDR2 337 and composited along with the scaled frame from the scaler 312. The output to the 4:2:2 to 4:4:4 converter 320 has the PIP/POP image on a screen sized background.

In VCR mode the output of vertical scaler 312 is sent to VCR unit 325. This scaled picture is saved in the DDR2 337 frame store unit. In order to save bandwidth on the memory bus, NV unit 342 is capable of doing a 1/2, 1/3 or 1/4 horizontal scaling on the video information as it is stored to the DDR2 337 frame memory unit. Simple display processor 330 will further scale the image via scaler 332 to 4801 and output it to video compositor 319. In VCR mode video compositor 319 deals only with the picture from PIX FIFO 318. This picture can be full screen size or it can be in a window over a colored background.

Video compositor 319 outputs the 4:2:2 picture to edge detail enhancer 321 via 4:2:2 to 4:4:4 converter 320. Edge detail enhancer 321 sends the resulting output to color space converter (CICAM) 322. Color processor 323 works on the picture in CIECAM color space. The resulting picture is sent to the INV CIECAM converter 324 which transforms the CIECAM data to RGB data. On-screen display interface 233 buffers the RGB data as necessary to feed a high definition video encoder that will drive the liquid crystal display (LCD) or plasma display panel as better illustrated in FIG. 2.

The three types of black bars are illustrated in FIG. 4. FIG. 4A illustrates the curtains type. In the curtains type video 401 fills the vertical extent of picture 410 leaving left vertical bar 402 and right vertical bar 403.

FIG. 4B illustrates the letterbox type. In the letterbox type video 401 fills the horizontal extent of picture 410 leaving top bar 404 and bottom bar 405. FIG. 4C illustrates the box type. In the box type video 401 fills neither the vertical extent nor the horizontal extent of picture 410 leaving annual box 406.

Figure 5:
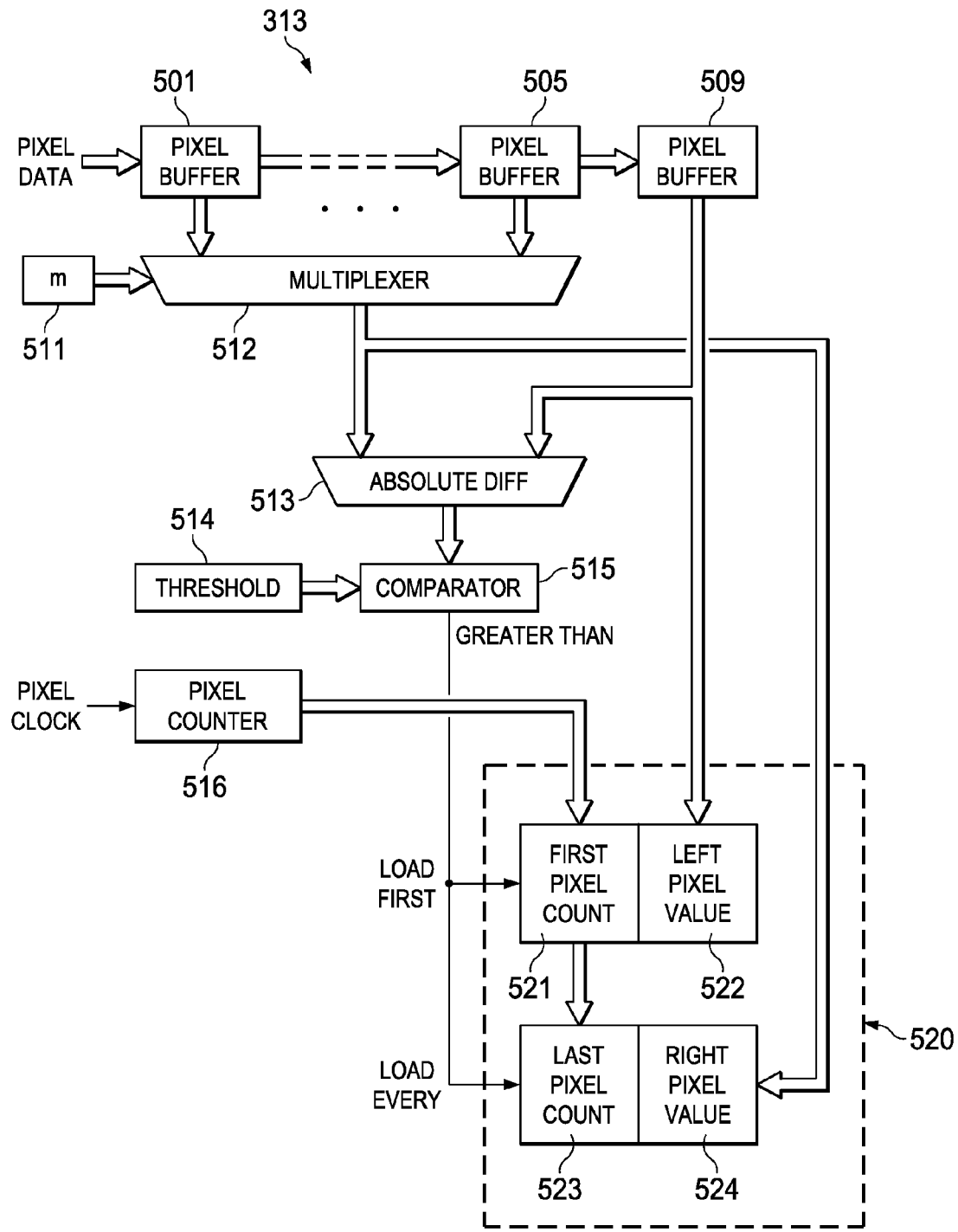
FIG. 5 illustrates an example embodiment of black box detector of this invention.

FIG. 5 illustrates an example embodiment of black box detector 313. Black box detector 313 searches an incoming picture for edges that define a transition between a black or grayscale bars and the active video that bracket active video. The black or grayscale bar can be vertical or horizontal. Only luma pixels are used in black box detector 313. Black box detector 313 snoops luma pixel information being transferred from memory manager 311 to the top of display processor 300 on datapath 310.

Incoming pixel data supplies a chain of pixel buffers 501 to 505 and 509. Each pixel buffer stores corresponding pixel data of a single video line for one pixel period. Upon receipt of next pixel data each pixel buffer 501 to 505 and 509 supplies its data to a next pixel buffer and receives data from a prior pixel buffer. Register 511 stores the number of pixels m in a search exclusion window. This search exclusion window will be further described below. The pixel data of pixel buffers 501 to 505 supply inputs to multiplexer 512.

Register 511 supplies the control input to multiplexer 512. Multiplexer 512 selects for output the pixel data from one of the pixel buffers 501 to 505 dependent upon the value of m stored in register 511. This output of multiplexer 512 supplies one input of absolute difference unit 513. The pixel data stored in pixel buffer 509 supplies a second input to absolute difference unit 513. Absolute difference unit 513 computes the absolute value of the difference in pixel value between the pixel value selected by multiplexer 512 and the pixel value stored in pixel buffer 509.

Threshold register 514 stores a selected threshold value for the current line of the current frame. A unique threshold value can be set for each line and stored in internal memory. This allows programmable control to bounding box detector 313 after fabrication. Table 1 shows an example layout of the threshold data in the internal results SRAM.

TABLE 1

| | Bits | |
|---|---|---|
| | 15      8 | 7      0 |
| Address 0 | Line 0 Threshold | Line 1 Threshold |
| Address 1 | Line 2 Threshold | Line 3 Threshold |
| | . . . | |

TABLE 1-continued

| | Bits | |
|---|---|---|
| | 15      8 | 7      0 |
| Address 539 | Line 1078 Threshold | Line 1079 Threshold |

The pixel value thresholds for two lines of 8 bits each are packed into 16-bit data words. Each line is thus assigned a programmable threshold level stored in internal results SRAM. The edge detection logic uses the threshold level via threshold register 514 to determine whether or not to save the pixel index in the result SRAM.

Comparator 515 compares the absolute difference from absolute difference unit 513 with the corresponding threshold value stored in threshold register 514. Comparator 515 produces a greater than output when the absolute difference is greater than the threshold.

Pixel counter 516 receives a clock at the pixel rate (pixel clock) and maintains a pixel index matching the position of the pixel stored in pixel buffer 509 in the current line. This pixel index, the pixel value selected by multiplexer 512 and the pixel value stored in pixel buffer 509 are supplied to internal results SRAM 520 including a first pixel index 521, left pixel value 522, last pixel index 523 and right pixel value 524.

For every line of video of each frame internal results SRAM 520 stores data corresponding to the first and last pixels where the absolute value of the pixel difference exceeds the threshold. For the first time comparator 515 generates a greater than output within a particular video line, the current pixel index stored in pixel counter 516 is stored in both first pixel index 521 and last pixel index 523, the pixel value stored in pixel buffer 509 is stored in left pixel value 522 and the pixel value selected by multiplexer 512 is stored right pixel value 524. For subsequent times within the video line that comparator 515 outputs a greater than signal, the current pixel index stored in pixel counter 516 is stored in last pixel index 523 and the pixel value selected by multiplexer 512 is stored in right pixel value 524. These subsequent loadings of last pixel index 523 and right pixel value 524 overwrite prior data. At the end of a line: first pixel index 521 stores the pixel location of a first instance where the absolute difference exceeded the threshold within the video line; left pixel value 522 stores the pixel value to the left of this first instance where the absolute difference exceeded the threshold; last pixel index 523 stores the pixel location of a last instance where the absolute difference exceeded the threshold; right pixel value 524 stores a pixel value to the right of this last instance where the absolute difference exceeded the threshold. Note if there is only one instance of the absolute difference being greater than the threshold, then last pixel index 523 is the same as first pixel index 521. If there are no instances of the absolute difference being greater than the threshold, then storage locations 523 and 524 store an initial default value of all 1s (hexadecimal FFF).

The first pixel in the line is at index O. For a line with n pixels, the last pixel in the line is at index n−1. Internal results SRAM 520 preferably stores the index value as a 12-bit number. These 12 bits allow a maximum pixel index value of $2^{12}-1$ or 4095. First pixel index 521 and last pixel index 523 are initialized at all 1s (hexadecimal FFF). If no edge is detected on a line, the initialization value of hexadecimal FFF will be stored at both storage locations 521 and 523. Left pixel value 522 and right pixel value 524 are preferably initialized as all 0s.

Suppose a vertical black bar is at the left of the picture and the discontinuity of the intensity values between the black bar and the active video is sharp. When this video is digitally compressed and decompressed, the sharp discontinuity is smoothed out. If there were a sharp discontinuity between two adjacent pixels in the original picture, the recovered picture would show a gradual discontinuity between the two adjacent pixels. Bounding box detector 313 uses a search exclusion window. Bounding box detector 313 compares luma differences between a pixel on the left of the window and one on right of the window. The size of this search exclusion window is programmable and is defined by the variable m stored in register 511.

This bounding box pre-calculation can be performed in software in CPU 223 if CPU 223 has the computational capacity.

The pseudo-code listing below is an example implementation of the bounding box pre-calculation for a whole frame. In this pseudo-code: j is the line number index; i is the pixel location index; m is the search exclusion window size where preferably 15; N is the number of pixels in a line; P[i] is the pixel luminance value of pixel i; and threshold[j] is the threshold value for line j.

Listing 1

```
For (j=0; j<NumLines; j++)
    {For (i=0; i<N−m; i++)
        {If (abs(P[i]−P[i+m]) > threshold[j]), then
            {If (first_edge_detected_in_line), then
                *Save the value of i as the FirstIdx in
                    internal results SRAM for this line
                *Save the value P[i−1] as the LeftPix
                    value for this line }
            {If i−1==−1, then
                *Save the value P[0] as LeftPix value for
                    this line }
            else { // Not first detected edge in line
                *Save the value of i as the LastIdx in
                    the results SRAM for this line
                *Save the value P[i+m] as the RightPix
                    for this line }
        }
    }
}
```

The result information for two lines can be stored in one cycle. The first index is where the threshold is exceeded the first time. The last index is the pixel index where the threshold is exceeded the last time. Table 2 shows an example of packing the results obtained from processing data with this pseudo-code. Note the index values (First Idx and Last Idx) are 12 bits and the pixel values (Left Pixel and Right Pixel) are 8 bits. Values for two lines can thus be packed into 80-bit data words (five 16-bit data words).

TABLE 2

| | Bits | | | | | | | |
|---|---|---|---|---|---|---|---|---|
| | 79 68 | 67 56 | 55 44 | 43 32 | 31 24 | 23 16 | 15 8 | 7 0 |
| Address 0 | Line 0 First Idx | Line 0 Last Idx | Line 1 First Idx | Line 1 Last Idx | Line 0 Left Pixel | Line 0 Right Pixel | Line 1 Left Pixel | Line 1 Right Pixel |
| ... | | | | | | | | |
| Address 539 | Line 1078 First Idx | Line 1078 Last Idx | Line 1079 First Idx | Line 1079 Last Idx | Line 1078 Left Pixel | Line 1078 Right Pixel | Line 1079 Left Pixel | Line 1079 Right Pixel |

As noted above in FIG. 5 and Table 2, internal results SRAM 520 contains the actual pixel value found on the left and the right side of the presumed active video once an edge is detected. The pixel values are saved to ensure that the black or gray areas of the bar are uniform. The edge detector is triggered when the difference between pixel values on either side of a search exclusion window exceed a threshold. However, the edge detection may trigger incorrectly on two different sets of data with the same difference in pixel data value. An example of this is illustrated in FIG. 6.

FIG. 6 illustrates an example of two lines, line X 610 and line Y 620. The pixel luminance value of left pixel 611 of line X 610 is 5 and the pixel luminance value of right pixel 615 following the search exclusion window 612 is 70. The absolute value of the pixel difference between left pixel 611 and right pixel 615 is 65. The pixel luminance value of left pixel 621 of line Y 620 is 75 and the pixel luminance value of right pixel 625 following the search exclusion window 622 is 140. This also yields a pixel difference between left pixel 621 and right pixel 625 or 65. The luminance value of 75 of left pixel 621 of line Y 620 is significantly brighter than the value of 5 of left pixel 611 of line X 610. A bounding box providing edge detector works from the absolute values of the pixel differences would indicate an edge condition in both line X 610 and line Y 620 if the threshold is set to less than 65.

The result of this pre-processing is that the pixel luminance value to the left of the window is saved in the internal results SRAM for the first edge found in a line. The pixel luminance value to the right of the window is saved in the internal results SRAM for the last edge found in the line. Software running on CPU 223 analyzes this data for all the lines for each frame or field of incoming video to verify the uniformity of pixel luminance data in the black or grayscale side of the edges. The software does not indicate a vertical edge if the pixel luminance values to the left of the first edge found in all the lines are not uniform and/or the pixel luminance values to the right of the last edge found all the lines are not uniform even though the edge indices more of less form a straight line. The software requires the black or grayscale pixel luminance be consistent in the supposed bars.

Detecting a horizontal bar is straightforward. After sending a line through bounding box detector 308 both the first and last indices are still set to the initialized value of hexadecimal FFF, then no edge is detected. The software analyzing the internal result SRAM data determines that the pixel differences around the search exclusion window never exceeded the threshold value set for each line.

When the search window exclusion size m=0, a special mode is employed. An edge is indicated whenever a luma pixel value exceeds the threshold value set for each line. When using bounding box detector 313 multiplexer 512 outputs a 0 value. The absolute difference unit 513 thus determines the absolute value of the pixel value received from pixel buffer 509. Essentially, mode m=0 finds bright spots in the picture. Assuming that the bounding regions are dark with low luminance values, setting a low threshold value would essentially save the transitions between black to bright regions in the screen.

Bounding boxes may not be completely black. They may even be gray. The digital sampling of the bounding boxes may have high levels of noise that exceed the threshold settings. In mode m=0, the thresholds must be set very low. This mode is not as robust as using the search exclusion window. However when detecting black bars using software running on CPU 223 mode m=0 is easier to implement. This technique saves computation because it does not need to check the first and last pixel values to validate uniformity.

Analyzing an entire frame or field of video for bounding bars is too time consuming for traditional CPUs. Bounding box detector 308 uses hardware to analyze the incoming video frame by frame. The output of bounding box detector 308 is analyzed every field for interlaced input or for every frame for progressive input. These results provide enough information for the system CPU to determine black or grayscale bounding areas in the source video. The CPU can then reprogram the display processor pipeline to resize and/or crop the video to remove the bounding bars or box. Being able to see more of the active video on the display may be a desired feature of a TV set or digital set-top box.

Figure 7:
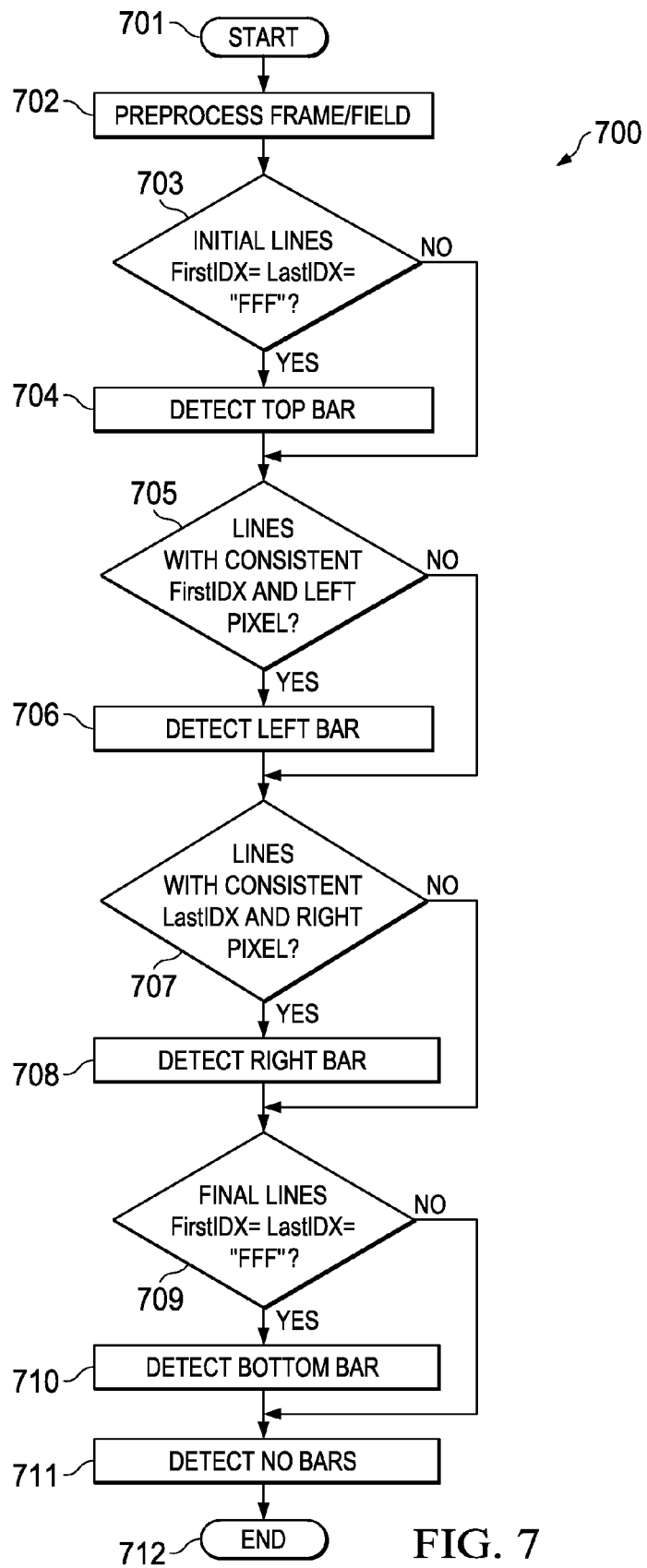
FIG. 7 illustrates a program to detect black bars in a video frame from the results of the black box detector of FIG. 5.

FIG. 7 illustrates program 700 to detect black bars in a video frame. Program 700 begins at start block 701. Block 702 preprocesses the video frame or field. This preprocessing occurs in bounding box unit 313 illustrated in FIG. 5 or by CPU 223 executing listing 1. Decision block 703 determines whether a number of initial lines in the frame or field have both FirstIDX and LastIDX at the default value hexadecimal FFF. If this is true (Yes at decision block 703), then block 704 detects a corresponding top horizontal bar such as 404 illustrated in FIG. 4B.

If initial lines do not have both FirstIDX and LastIDX at the default value (No at decision block 703) or following detection of a top bar in block 704, decision block 705 determines if there is a series of lines having consistent FirstIDX and left pixel values. This condition is described above. If this is true (Yes at decision block 705), then block 706 detects a corresponding left vertical bar such as 402 in FIG. 4A. FIG. 4C shows that detection of a top bar does not exclude detection of a left bar.

If there is no series of lines having consistent FirstIDX and left pixel values (No at decision block 705) or following detection of a left bar in block 706, decision block 707 determines if there is a series of lines having consistent LastIDX and right pixel values. This condition is described above. If this is true (Yes at decision block 707), then block 708 detects a corresponding right vertical bar such as 403 in FIG. 4A.

If there is no series of lines having consistent LastIDX and right pixel values (No at decision block 707) or following detection of a right bar in block 708, decision block 709 determines if a number of final lines in the frame or field have both FirstIDX and LastIDX at the default value. If this is true (Yes at decision block 709), then block 710 detects a corresponding bottom horizontal bar such as 405 in FIG. 4B.

If no final lines in the frame or field have both FirstIDX and LastIDX at the default value (No at decision block 709), the block 711 determines there are no black bars in the frame or field. Program 700 ends at end block 712.

What is claimed is:

1. A preprocessor for black box detection in a video frame or field comprising:
a chain of pixel buffers including at least one first pixel buffer and a last pixel buffer, each pixel buffer receiving pixel data of a predetermined line of the video frame or field from a prior pixel buffer in said chain, temporarily storing said pixel data for one pixel period and outputting said pixel data to a next pixel buffer in said chain, a first pixel buffer receiving pixel data from a video source;
an absolute difference unit having a first input receiving said pixel data stored in a predetermined one of said at least one first pixel buffer, a second input receiving pixel data stored in said last pixel buffer and an output forming an absolute value of a difference pixel data received at said first input and pixel data receive at said second input;
a comparator having a first input receiving a predetermined threshold value, a second input receiving said absolute value and an output generating a greater than signal if said absolute value is greater than said predetermined threshold value;
a pixel counter toggled by a pixel clock each pixel period thereby storing a pixel count corresponding to a location within the video line of said pixel data stored in said last pixel buffer;
a memory connected to said predetermined first pixel buffer, said last pixel buffer, said comparator and said pixel counter, said memory operable to
store a first pixel count equal to said pixel count of said pixel counter and store left pixel data equal to said pixel data of said last pixel buffer upon a first instance of said greater than signal from said comparator during said predetermined line, and
store a last pixel count equal to said pixel count of said pixel counter and store right pixel data equal to said pixel data of said predetermined first pixel buffer upon each instance of said greater than signal from said comparator during said predetermined line.

2. The preprocessor of claim 1, wherein:
said at least one first pixel buffer comprises a plurality of first pixel buffers; and
said preprocessor further comprising a multiplexer having a plurality of inputs, each input connected to one of said plurality of first pixel buffers, a control input and a output connected to said first input of said absolute difference unit, said multiplexer selecting pixel data received at one of said plurality of inputs corresponding to said control input for supply to said output.

3. The preprocessor of claim 2, further comprising:
a register storing a predetermined constant m, said register is connected to said control input of said multiplexer; whereby said multiplexer selects an input for output dependent upon said constant m stored in said register.

4. The preprocessor of claim 1, further comprising:
a line threshold memory storing a predetermined threshold value for each line of the video frame or field, said line threshold memory supplying said predetermined threshold value for a current line to said comparator.

5. The preprocessor of claim 4, wherein:
said threshold values consist of 8 bits; and
said line threshold memory consists of 16-bit data words, each 16-bit data word storing two 8-bit threshold values.

6. The preprocessor of claim 1, wherein:
said pixel counter consists of 12 bits; and
said memory is organized into groups of 80 bits corresponding to data for two lines consisting of:
12 bits of said first pixel count of a first line,
12 bits of said last pixel count of said first line,
12 bits of said first pixel count of a second line,
12 bits of said last pixel count of said second line,
8 bits of said left pixel value of said first line,
8 bits of said right pixel value of said first line,
8 bits of said left pixel value of said second line, and
8 bits of said right pixel value of said second line.

7. The preprocessor of claim 1, further comprising:
a central processing unit connected to said memory and programmed to access said memory to
initially store a predetermined constant in said memory for said first pixel count and said last pixel count for all lines of a next video frame or field, and
detect a top black bar if said first pixel count and said second pixel count both equal said predetermined number for a number of initial lines in said video frame or field.

8. The preprocessor of claim 1, further comprising:
a central processing unit connected to said memory and programmed to access said memory to detect a left black bar if said first pixel count and said left pixel value are consistent for plurality of lines of said video frame or field.

9. The preprocessor of claim 1, further comprising:
a central processing unit connected to said memory and programmed to access said memory to detect a right black bar if said last pixel count and said right pixel value are consistent for plurality of lines of said video frame or field.

10. The preprocessor of claim 1, further comprising:
a central processing unit connected to said memory and programmed to access said memory to
initially store a predetermined constant in said memory for said first pixel count and said last pixel count for all lines of a next video frame or field, and
detect a top black bar if said first pixel count and said second pixel count both equal said predetermined number for a plurality of final lines in said video frame or field.

11. A method of preprocessing for black box detection in a video frame or field comprising the steps of:
forming an absolute difference between pixel data of a first pixel and a second pixel a predetermined distance apart in a line of the video frame or field;
comparing said absolute difference with a predetermined threshold value;
counting pixels on said line corresponding to a location of said first pixel;
storing a first pixel count equal to said pixel counter and storing left pixel data equal to said pixel data of said first pixel upon a first instance of said absolute difference being greater than said predetermined threshold; and storing a last pixel count equal to said pixel counter and storing right pixel data equal to said pixel data of said second pixel buffer upon each instance of said absolute difference being greater than said predetermined threshold.

12. The method of claim 11, further comprising the steps of:

storing a predetermined constant m; and wherein said step of forming said absolute difference selects said predetermined distance between said first pixel and said second pixel corresponding to m.

13. The method of claim 11, further comprising the step of:

storing said predetermined threshold value for each line of the video frame or field.

14. The method of claim 11, further comprising the steps of:

initially storing a predetermined constant for said first pixel count and said last pixel count for all lines of a next video frame or field; and detecting a top black bar if said first pixel count and said second pixel count both equal said predetermined number for a number of initial lines in said video frame or field.

15. The method of claim 11, further comprising the step of:

detecting a left black bar if said first pixel count and said left pixel value are consistent for plurality of lines of said video frame or field.

16. The method of claim 11, further comprising the step of:

detecting a right black bar if said last pixel count and said right pixel value are consistent for plurality of lines of said video frame or field.

17. The method of claim 11, further comprising the steps of:

initially storing a predetermined constant for said first pixel count and said last pixel count for all lines of a next video frame or field, and detecting a bottom black bar if said first pixel count and said second pixel count both equal said predetermined number for a plurality of final lines in said video frame or field.

* * * * *